Sept. 29, 1964 R. E. MARRS 3,151,319

HYDRODYNAMIC MEANS FOR SUPPORTING A TRANSDUCER

Filed Nov. 15, 1961 2 Sheets-Sheet 1

INVENTOR.
RALPH E. MARRS
BY Robert B Crouch
ATTORNEY

Sept. 29, 1964 R. E. MARRS 3,151,319

HYDRODYNAMIC MEANS FOR SUPPORTING A TRANSDUCER

Filed Nov. 15, 1961 2 Sheets-Sheet 2

United States Patent Office 3,151,319

Patented Sept. 29, 1964

3,151,319

HYDRODYNAMIC MEANS FOR SUPPORTING A TRANSDUCER

Ralph E. Marrs, Campbell, Calif., assignor to International Business Machines Corporation, New York, N.Y., a corporation of New York Filed Nov. 15, 1961, Ser. No. 152,493
5 Claims. (Cl. 340—174.1)

The present invention relates to a self-acting hydrodynamic means for supporting a magnetic transducer and more particularly to a self-acting hydrodynamic means utilizing a variable contour for supporting a transducer in constant, close proximity to an irregular recording surface.

In present day industrial magnetic recording where the emphasis is on recording the maximum amount of information in the minimum area of recording surface, the spacing between the transducer and the recording surface is of utmost importance. Wear problems require the transducer to operate out of contact with the recording surface, so it has been the objective to position the transducer as close as possible to the recording surface without incurring actual contact. Accurate reading of the recorded signals at high speeds requires that, as near as possible, the signals be of uniform intensity. However, this requirement is complicated by the fact that variations in the spacing between the transducer and the recording surface will produce corresponding variations in the intensity and resolution of the recorded signals. In addition, the density of the recorded signals per unit of area of the recording medium will vary inversely with the size or magnitude of the spacing. Accordingly, for efficient storage and readout of information the spacing between the transducer and the recording surface must not only be held to a minimum, but it must also be maintained essentially constant.

Self-acting hydrodynamically supported transducers, wherein the transducer is mounted in a rigid shoe supported above the recording surface by an air bearing, have been proposed as a means of reducing the transducer-to-recording surface spacing to accomplish high density recording. However, particularly in the case of rigid disks or drums, it has been very difficult and expensive to achieve a perfectly smooth recording surface. As a consequence most such recording surfaces have had at least some irregularities. The conventional shoes have been rigid and have employed fixed contours which glide above the recording surface. Since such air bearing shoes are stiff and inflexible they have been incapable of maintaining constant spacing over depressions and protrusions in the recording surface. Accordingly, such a shoe will be deflected by irregularities in the surface to cause variations in the spacing between the transducer and the recording surface. In addition, deflection of an air bearing shoe by surface irregularities can result in collision of the shoe and the surface with consequent damage to one or both. Besides causing nearly instantaneous spacing changes, surface irregularities also impart momentum to the rigid air bearing shoe effecting long lasting (on the order of milliseconds) changes in the load bearing pressures and other operating characteristics of the viscous air film between the shoe and the recording surface which may result in collision or other uncontrolled behavior of the air bearing shoe.

The object of the present invention is to provide a hydrodynamic means for supporting a magnetic transducer in constant proximity to a recording surface, the means being capable of adjusting to recording surface irregularities and thus, maintaining essentially constant spacing between the transducer and the recording surface.

The present invention provides a hydrodynamic means for supporting a magnetic transducer which is self-gimbaling and self-adjustable to variations in loading pressures. In this invention, a magnetic transducer is mounted in a pliable bag which is in turn mounted on an appropriate arm and loaded against an air bearing surface of a recording medium. The bag forms a flexible gliding shoe which adjusts to surface irregularities to maintain the transducer in constant proper recording relationship with the recording surface, minimizing risk of collision between the two.

Other objects and many of the attendant advantages in this invention will be readily appreciated as the same becomes better understood by reference to the following detailed description when considered in connection with the accompanying drawing wherein FIG. 1 is an elevation view in section of one form of the present invention;

Figure 1:
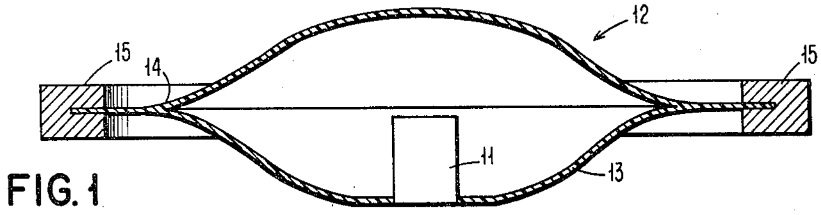

As illustrated in FIG. 1 the present invention comprehends a gliding shoe construction which includes a magnetic transducer 11 mounted in a pliable inflated bag 12, the lower portion of which constitutes a variable contour shoe surface 13 for supporting the transducer above the recording surface. The transducer is molded into, or otherwise secured to, the shoe with the lower surface of the transducer coextensive with the surface 13 of the shoe. The lateral edges of the bag are sealed as at 14 and are secured to a mounting rig 15 over the entire circumference of the bag.

When the flexible bag shoe of the present invention is loaded against an air bearing surface (such as disk) moving at high velocity relative to the shoe, the shoe will be supported at a constant separation from the air bearing surface by a self-acting hydrodynamic pressurized film of air. Due to the curved configuration of the shoe surface 13 an entering wedge is formed, causing a constriction of the passage for boundary layer air between the shoe and the air bearing surface. This causes an increase in pressure within the film of air between the shoe and the air bearing surface due to viscous forces. When this developed pressure becomes equal to the loading pressure of the shoe, no further constriction occurs and the air film thickness "$h$" remains constant until the flexible bag shoe leaves the surface of the air bearing. If the shoe is pre-pressurized by the air pressure within the flexible bag, the unit pressure of the viscous air film will always be very near the original pre-pressurization of the bag. Additional loading force applied through the arm, or otherwise, simply causes a greater area of the shoe to flatten out against the disc, the shoe volume is not significantly changed and the pressure remains essentially constant.

Figure 2:
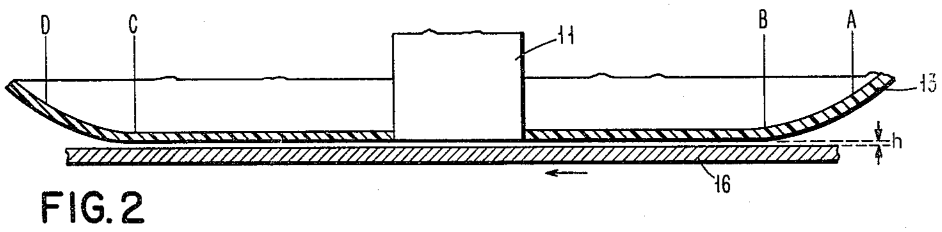
FIG. 2 is a fragmentary view at an enlarged scale of the flexible shoe of FIG. 1.

The shoe surface of the present invention is shown in operating position adjacent a recording disk 16 in FIG. 2. In this position the shoe is loaded against the recording disk which is rotating in the direction of the arrow. As shown, an entry region exists from A to B which is within the limits of the boundary air film carried by the rotating disk. This entry region provides a convergent or wedge channel for the incoming air. The wedging action of the shoe on the boundary layer air continues to point B at which point the pressure in the air film is equal to the internal pressure of the flexible bag shoe. Considering the case where there is no sidewise bleeding of pressurized air developed in the air film, then the pressure within the air film from B to C of FIG. 2 will remain constant and the spacing "$h$" will also be constant. External loading applied to this type of shoe causes almost no change in volume of the bag or internal pressure. Like an automobile tire, additional loading is supported by a change in shape (flattening) which brings more of the shoe surface 13 into a load bearing condition. Within reasonable limits, the spacing "$h$" is a function of such things as the internal pressure within the bag (which is nearly constant), effect of sidewise bleeding of viscous air film which can be minimized through design, surface velocity, air viscosity, etc. All of these parameters can be made essentially constant except surface velocity which will vary from the inner radius to the outer radius of a disk. Therefore, with this type of structure the transducer-to-recording surface spacing is independent of loading within reasonable limits.

Figure 4:
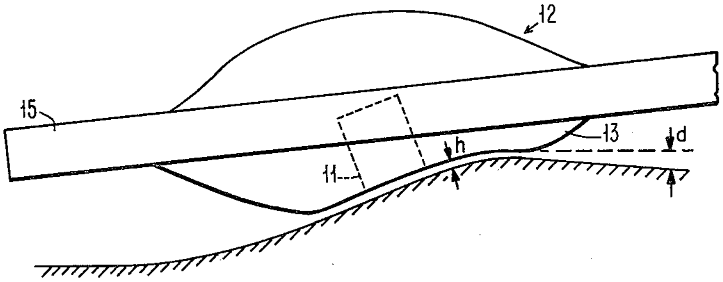
FIG. 4 is an elevation view of the device of FIG. 1 in operation.
Figure 3:
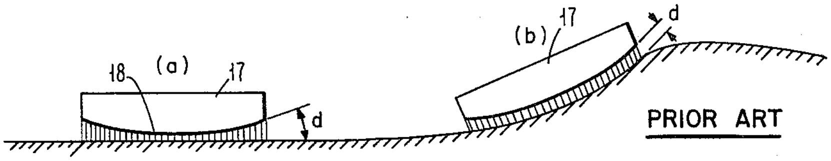
FIG. 3 is an elevation view of a rigid air bearing shoe in operation.

FIG. 3 illustrates how a conventional rigid air bearing shoe 17 rides over an irregularity in the recording surface. As shown, both the effective crown height and the approach angle are reduced by the approach of a protruding irregularity. As indicated in the drawing, the lower surface 18 of a rigid gliding shoe has a smoothly rounded crown, frequently on the order of 250–350 micro inches in height. Viewing a rigid shoe in operation position (FIG. 3*a*), and in particular the gap between the shoe and the recording surface extending over that portion of the shoe surface upon which the boundary layer air film exerts a pressure (from A to D in FIG. 2), the effective crown height can be expressed as the difference between the maximum and the minimum gap dimensions, i.e. the difference between the dimensions at A and B in FIG. 2. The approach angle ($d$) can be defined as the angle between the entry region of the shoe surface and the recording surface, i.e. the angle defined by the tangent to the recording surface and a line drawn through points A and B of FIG. 2. The effective crown height over a flat surface is indicated by the shaded section in FIG. 3*a*. When the rigid shoe reaches the point where the irregularity protrudes from the recording surface, the effective crown height is reduced to zero, as shown in the shaded section of FIG. 3*b*. At the same time, the entry region of the shoe surface is essentially parallel to the tangent to the surface of the irregularity, so the approach angle is likewise reduced to zero. This particular condition invariably results in collision of the shoe with the recording surface, since any appreciable reduction in the effective crown height and the approach angle will drastically affect load carrying ability of the air bearing shoe. No such problem exists with the flexible bag shoe of the present invention, since, as shown in FIG. 4, the effective crown height and approach angle are unaffected by recording surface imperfections. As illustrated, the contour of the shoe surface 13 flexes to conform to the shape of the irregularity, so that both the effective crown height and the approach angle remain essentially constant. In addition, if the total instantaneous load increases as a result of rapid accelerations, or otherwise, the effective area of the air bearing surface of the flexible bag increases, thereby increasing the load carrying ability. Likewise, if the instantaneous load decreases, the effective air bearing area of the bag decreases. The net effect is a much more uniform pressure in the supporting viscous air film and spacing "$h$" than with the conventional rigid gliding shoe.

Figure 5:
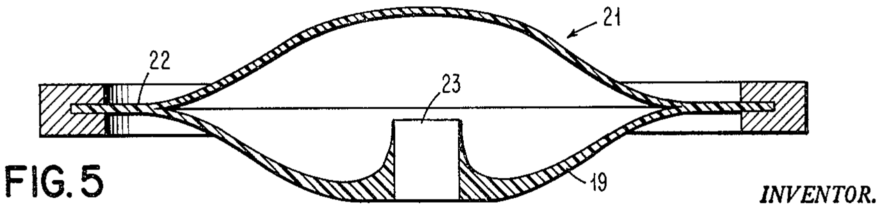
FIG. 5 is an elevation view in section of a preferred embodiment of the present invention.

If the shoe of the present invention is constructed of infinitely pliable film, the transducer itself becomes a rigid shoe and the effect of the pliable film is negligible. At the other extreme, a very stiff film would create an essentially rigid gliding shoe of the size of the whole structure. The problem is to achieve a structure which is flexible yet supports a transducer over a large part of the total area of the shoe. The configuration illustrated in FIG. 5 accomplishes the desired result. In this configuration the lower portion 19 of the shoe 21 is formed of a pliable film which increases in thickness radially inward from the outer rim 22 to the transducer 23. The load bearing ability of the shoe is therefore spread out from the center and gradually decreases while at the same time the degree of flexibility of surface 19 increases.

Figure 6:
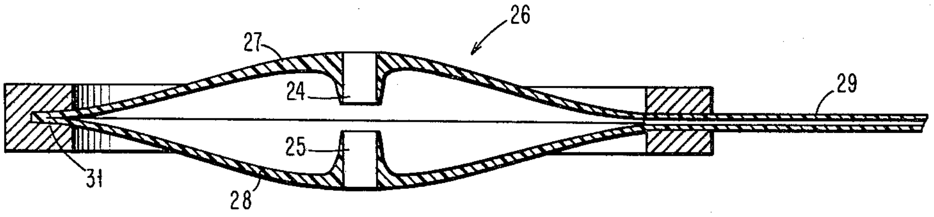
FIG. 6 is an elevation view in section of another embodiment of the present invention.

The construction of FIG. 6 has particular applicability to a disk-type memory in which a plurality of disks are positioned in parallel relationship for rotation about a common axis. In this embodiment, a pair of transducers 24, 25 are mounted in opposing relationship in a flexible bag 26. The upper and lower portions 27, 28 of the bag each define a shoe surface and one of the transducers is molded in, or otherwise secured to, each such portion of the bag. A tube 29 is attached to the bag and extends to a source of air (not shown) to allow the bag to be inflated and deflated. This construction allows the bag to be deflated for insertion into the space between adjacent disks. The bag is then inflated to extend the transducers into operating poistion with the lower surface of one disk and the upper surface of the adjacent disk. When it is desired to move the transducers to a new position the bag can be deflated and then withdrawn from the disks and moved to a new position between different disks. The upper and lower portions of the bag are similar to the construction of FIG. 5 in that the thickness of the pliable film increases radially inward from the outer rim 31.

Figure 7:
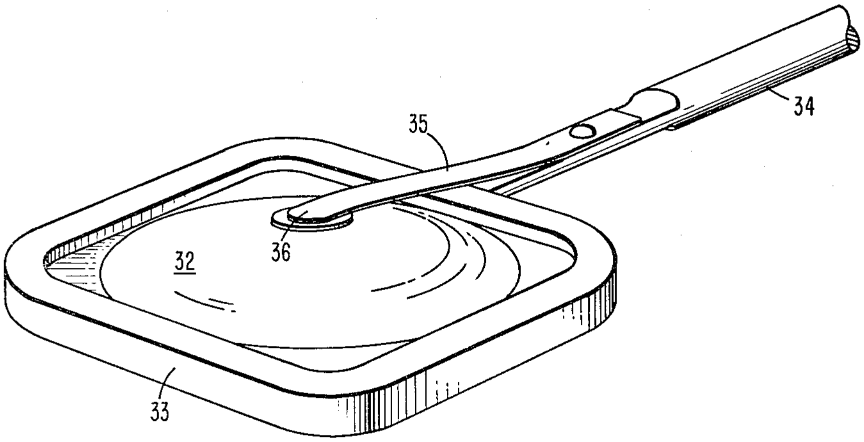
FIG. 7 is a perspective view of the present invention showing the mounting ring and access arm.

FIG. 7 is illustrative of one way of applying external load to the flexible bag shoe of the present invention. In this construction the bag 32 is mounted in a ring 33 which is secured to an access arm 34. A cantilever leaf spring 35 is attached at one end to the arm while the free end 36 bears against the bag on the surface removed from the transducer. Flexure of the spring 35 exerts pressure on the upper surface of the bag when the lower surface thereof is moved into operating proximity to a recording surface. This construction points up one of the major advantages of the flexible bag shoe, i.e. the fact that it is self-gimbaling. The ring 33 is affixed to the access arm 34 such that it will be approximately parallel to the plane of the recording surface. Due to the flexibility of the bag and the ability of the shoe surface to conform to the contour of the recording surface, the bag will position itself within the ring and will achieve the proper attitude relative to the recording surface. Accordingly the ring can be rigidly secured to the arm and need not be gimbaled thereon. Since the ring is rigidly secured to the arm the external load can be applied from the arm through the ring to the flexible bag if desired. In such case the cantilever spring 35 could be omitted.

The overall size of the flexible bag shoe in the present invention depends upon the size and weight of the transducer associated with it. In practice, the overall dimensions of the flexible bag shoe are approximately the same as those of the conventional rigid air bearing shoes. This derives from the fact that while the load carrying ability of the flexible bag shoe may be less than that of the rigid shoe (when related to overall dimensions), the mass of the flexible bag shoe plus its transducer is considerably less than the mass of the conventional rigid shoe plus its transducer. This reduced mass leads to another advantage of the flexible bag shoe over the conventional rigid shoe, in that the transient response for the flexible bag shoe is considerably faster than that of the rigid shoe. Since the flexible bag shoe has considerably less mass than the conventional rigid shoe it is able to follow irregularities in the recording surface at constant spacing much more accurately than can the rigid shoe. The flexible bag itself can be formed of any suitable material, such as rubber, plastic, etc., which has the proper molding characteristics, pliability, toughness, etc.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What is claimed is:

1. A flexible bag shoe for supporting a magnetic transducer in constant close proximity to a moving recording surface, comprising:
an upper and lower portion of pliable material joined together around their entire periphery;
a transducer mounted in the approximate center of the lower portion flush with the lower surface thereof;
the lower portion extending radially outward from the transducer forming a variable contour shoe surface capable of conforming to irregularities in the recording surface.

2. A flexible bag shoe as defined in claim 1 wherein:
the load bearing ability of the lower portion progressively decreases and the flexibility thereof progressively increases radially outward away from the transducer.

3. A flexible bag shoe as defined in claim 1 wherein:
the thickness of the lower portion decreases progressively radially outward away from the transducer.

4. A flexible bag shoe as defined in claim 1 wherein:
a mounting ring surrounds the flexible bag and is secured to the periphery thereof; and
an elongated access arm is rigidly secured to the ring.

5. A flexible bag shoe for supporting a pair of magnetic transducers in constant close proximity to a pair of spaced moving recording surfaces, comprising:
an upper and lower portion of pliable material joined together around their entire periphery,
each portion progressively increasing in thickness radially inward from its periphery;
each portion forming a variable contour shoe surface capable of conforming to irregularities in the recording surface;
a transducer mounted in the approximate center of each portion flush with the outer surface thereof;
a mounting ring surrounding the bag and secured to the periphery thereof; and
a tube connected to the bag for inflating and deflating the same.

References Cited in the file of this patent

UNITED STATES PATENTS

| | | |
|---|---|---|
| 2,738,241 | Von Mohrenstein | Mar. 13, 1956 |
| 2,937,240 | Harker | May 17, 1960 |
| 2,950,104 | Bowser et al. | Aug. 23, 1960 |
| 3,036,304 | Willard | May 22, 1962 |